United States Patent [19]

Willinger

[11] Patent Number: 4,589,982
[45] Date of Patent: * May 20, 1986

[54] REMOVABLE POWER PACK PUMP ASSEMBLY

[75] Inventor: Allan H. Willinger, Englewood, N.J.

[73] Assignee: Willinger Bros., Inc., Oakland, N.J.

[*] Notice: The portion of the term of this patent subsequent to Apr. 23, 2002 has been disclaimed.

[21] Appl. No.: 596,530

[22] Filed: Apr. 4, 1984

[51] Int. Cl.$^4$ .......................... E04H 3/16; E04H 3/20
[52] U.S. Cl. .................................. 210/169; 210/416.2
[58] Field of Search ..................... 210/169, 416.2, 232, 210/222; 134/177.8; 417/420

[56] References Cited

U.S. PATENT DOCUMENTS

| | | | |
|---|---|---|---|
| 3,225,930 | 12/1965 | Willinger | 210/169 |
| 3,321,082 | 5/1967 | Willinger | 210/169 |
| 3,512,646 | 5/1970 | Willinger | 210/169 |
| 3,516,543 | 6/1970 | Willinger | 210/169 |
| 4,186,093 | 1/1980 | Willinger | 210/169 |
| 4,285,813 | 8/1981 | Stewart et al. | 210/169 |

Primary Examiner—Richard V. Fisher
Assistant Examiner—Sharon T. Cohen
Attorney, Agent, or Firm—Abraham Friedman

[57] ABSTRACT

An aquarium power pack pump assembly which can be removably applied to an aquarium filter or an aquarium vacuum as the pumping source for these devices. The power pack includes a housing with a cylindrical compartment contained in the housing and separated from the rest of the housing. The cylindrical compartment terminates into a neck portion depending from the housing. An axial aperture at one end of the neck portion permits the intake of water from the aquarium tank and a side aperture in the neck portion permits the discharge of water from the cylindrical compartment. A motor unit is provided in the housing which includes a stack of stator laminations having a coil crossing it. The stator laminations define a bore which receives the cylindrical compartments. A pump impeller unit is positioned in the compartment and is magnetically coupled to the motor unit for rotation upon energization of the coil. When applied to the aquarium filter, it will draw water into the filter for aeration and filtration. When removed and applied to the aquarium vacuum, it will draw debris laden aquarium water into the vacuum for cleaning of the aquarium water.

15 Claims, 5 Drawing Figures

& 1

REMOVABLE POWER PACK PUMP ASSEMBLY

BACKGROUND OF THE INVENTION

This invention relates to aquarium equipment, and more particularly to a removable power pack unit incorporating a motor and pump which can be selectively utilized to operate an aquarium filter or an aquarium vacuum.

Aquarium filters are well known in the art for the prupose of aeration and filtration of the aquarium water and at the same time provides circulation to such water. Generally, such filters require a pump to draw the water into the filter with the pump being operated by a motor. One type of motor and pump assembly which has been utilized effectively in aquarium filters is the magnetically coupled impeller. In these units, a motor is provided which is magnetically coupled to a magnet which is free to rotate about a shaft. The rotation of the magnet controls the rotation on an impeller which serves to draw water into the filter.

One type of external filter which incorporates such type of magnetically coupled impeller unit is described in my co-pending application Ser. No. 456,424 now U.S. Pat. No. 4,512,885 filed on Jan. 7, 1983 entitled "Aquarium Filter Assembly" and assigned to the asignee of the present invention. The entire disclosure of that application is hereinincorporated by reference. In that application there is described an external aquarium filter assembly which includes a housing having an intake receiving chamber in flow communication with a filter chamber. A removable unitary intake assembly is associated with the receiving chamber and a spillway is associated with the filter chamber for discharge of the clean water back into the aquarium tank.

In the aforementioned co-pending application, the removable unitary intake assembly includes an inverted U-shaped series of tubes including an inlet flow tube as one leg of the assembly and a discharge tube as the other leg. A pump impeller unit is supported in depending fashion from the discharge tube and is retained as part of the uintary intake assembly. A motor unit is provided as a separate unit which is supported underneath the filter housing unit. With the removable unitary intake assembly inserted in place on the filter housing, the pump impeller unit extends downwardly into a tube depending from the housing unit and which is received within the motor unit. As a result, the pump impeller unit is magnetically coupled to the motor unit and is caused to rotate by that motor unit.

Although such filter apparatus is extremely useful and easy to clean, another way of achieving the same beneficial results is to combine the pump impeller unit with the motor unit in a single composite assembly and maintain that separate from the intake unit. In doing so, there can be provided a single power pack unit which can be removed from the filter assembly separate and apart from the intake assembly which can be removed independently therefrom.

With the separate removable power pack unit, the same unit can then be utilized for powering other devices. Specifically, there is known in the art to utilize an aquarium vacuum to clean the debris from an aquarium tank. Specifically, U.S. Pat. No. 3,549,015 issued on Dec. 22, 1970 to the inventor of the present application, describes an adjustable hand operated aquarium cleaning pump. In that patent, the entire patent of which is hereinincorporated by reference, there is described an adjustable intake tube which is coupled to a bellows type of arrangement for hand pumping. A filter bag is connected to the tube by means of valves. As the hand bellows is operated, the debris laden water is drawn into the intake tube and passes through the valves in one way direction into the filter bag. The filter bag permits the water to flow back into the aquarium while retaining the debris in the bag.

The aforementioned patent describes such a vacuum which is hand operated by means of the bellows. However, once the power pack unit is removed from the filter assembly, it is possible that the same power pack unit can be utilized for motorized operation of such a vacuum.

SUMMARY OF THE INVENTION

It is accordingly an object of the present invention to provide aquarium apparatus for use with filters, vacuums and the like, which avoids the aforementioned problems of prior art devices.

Another object of the present invention is to provide a removable power pack pump unit which can be selectively utilized to draw water into a power filter or into a power vacuum for aquarium use.

Yet another object of the present invention is to provide a removable power pack unit which incorporates into a single unitary assembly both a motor and a pump impeller unit.

Still a further object of the present invention is to provide an aquarium filter assembly having a removable power pack pump unit and a separate removable intake tubing unit.

A further object of the present invention is to provide an aquarium filter assembly having a removable power pack unit which is retained in the filter assembly by means of a removable intake assembly unit.

Another object of the present invention is to provide a power operated aquarium vacuum including a removable power pack pump unit which is retained in place on the vacuum by means of a coupling arrangement.

Yet a further object of the present invention is to provide an aquarium kit including an aquarium filter assembly, an aquarium vacuum, and a removable power pack pump assembly which can be selectively utilized to operate the filter or the vacuum.

Yet another object of the present invention is to provide a removable power pack assembly unit which can be selectively utilized in conjunction with a power filter or an aquarium vacuum.

Briefly, in accordance with the present invention, there is provided a removable power pack assembly which can be selectively applied to either an aquarium filter or an aquarium vacuum. The power pack assembly includes a housing with a cylindrical compartment contained in the housing and isolated from the rest of the housing. The cylindrical compartment terminates in a neck portion which depends from the housing. An axial aperture is provided at the distal end of the neck portion which permits the intake of water from the aquarium tank. A side aperture in the neck portion permits the discharge of water from the cylindrical compartment. A motor unit is positioned in the housing and includes a stack of stator laminations which define a bore therein for receiving the cylindrical compartment. A motor coil crosses the laminations for energizing them. A pump impeller unit is positioned in the cylindrical compartment and is magnetically coupled to the motor unit for rotation upon energization of the coil to pump aquarium water into the axial aperture of the neck portion where the water can then be discharged from the side aperture. A cover is provided for securing onto the housing. The unit includes appropriate devices for coupling the housing unit to either the filter or the vacuum. In this way, the assembly can be selectively utilized to operate either the filter or the vacuum, as needed.

In an embodiment of the invention, there is also provided an aquarium filter assembly which includes a housing unit adapted to be mounted on a wall of an aquarium tank and includes a receiving chamber for receiving contaminated water from the aquarium tank and filter chamber for filtering the contaminated water. The chambers are in fluid flow communication with each other. A unitary intake tube assembly is supported on the housing unit and includes a supply tube at one end thereof for insertion into the aquarium tank and a coupling member at the other end thereof for engaging the neck portion of the power pack assembly and thereby coupling the intake tube to the inlet port of the neck portion. The intake tube thereby supplies the aquarium water to the inlet port of the power pack unit with the outlet port on the power pack unit discharging the water into the receiving chamber for the filtering of the aquarium water.

In another embodiment of the invention, the aquarium vacuum includes a tubular body member for the ingress of debris ladden aquarium water. An upper pumping end on the tubular body member receives the depending neck portion to couple the inlet port of the power pack assembly to the body member. A discharge aperture is provided through a peripheral side wall which will be in flow registry with the outlet port of the power pack unit. A filter bag is connected to the discharge aperture. In this manner, aquarium water is drawn into the body member and discharged into the filter bag.

The aforementioned objects, features and advantages of the invention will, in part, be pointed out with particularity and will, in part, become obvious from the follwing more detailed description of the invention, taken in conjunction with the accompanying drawings, which form an integral part thereof.

BRIEF DESCRIPTION OF THE DRAWINGS

In the various figures of the drawings, like reference characters designate like parts.

DESCRIPTION OF THE PREFERRED EMBODIMENT

Figure 1:
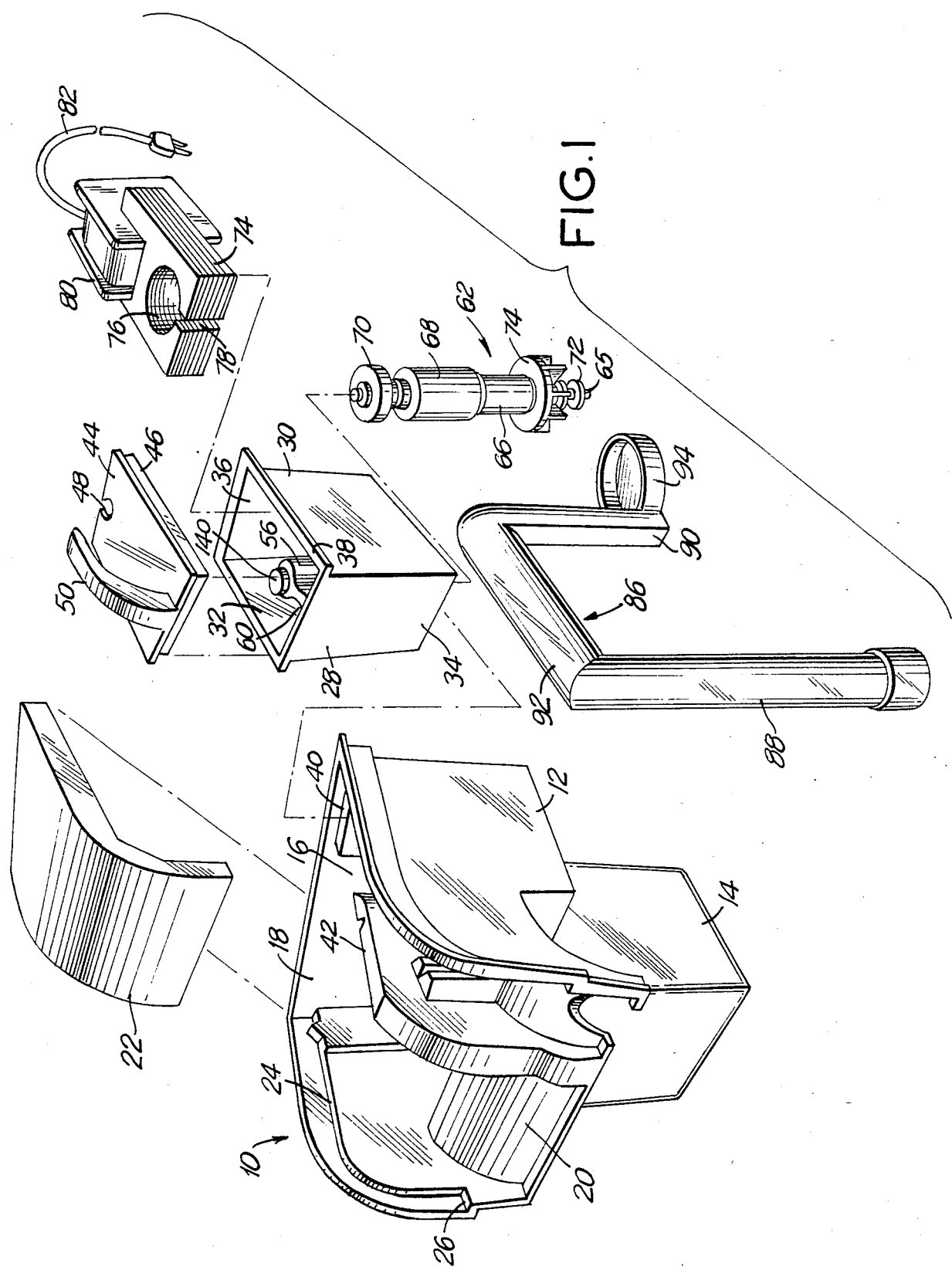
FIG. 1 is a perspective view of the removable power pack assembly in conjunction with the aquarium filter.
Figure 2:
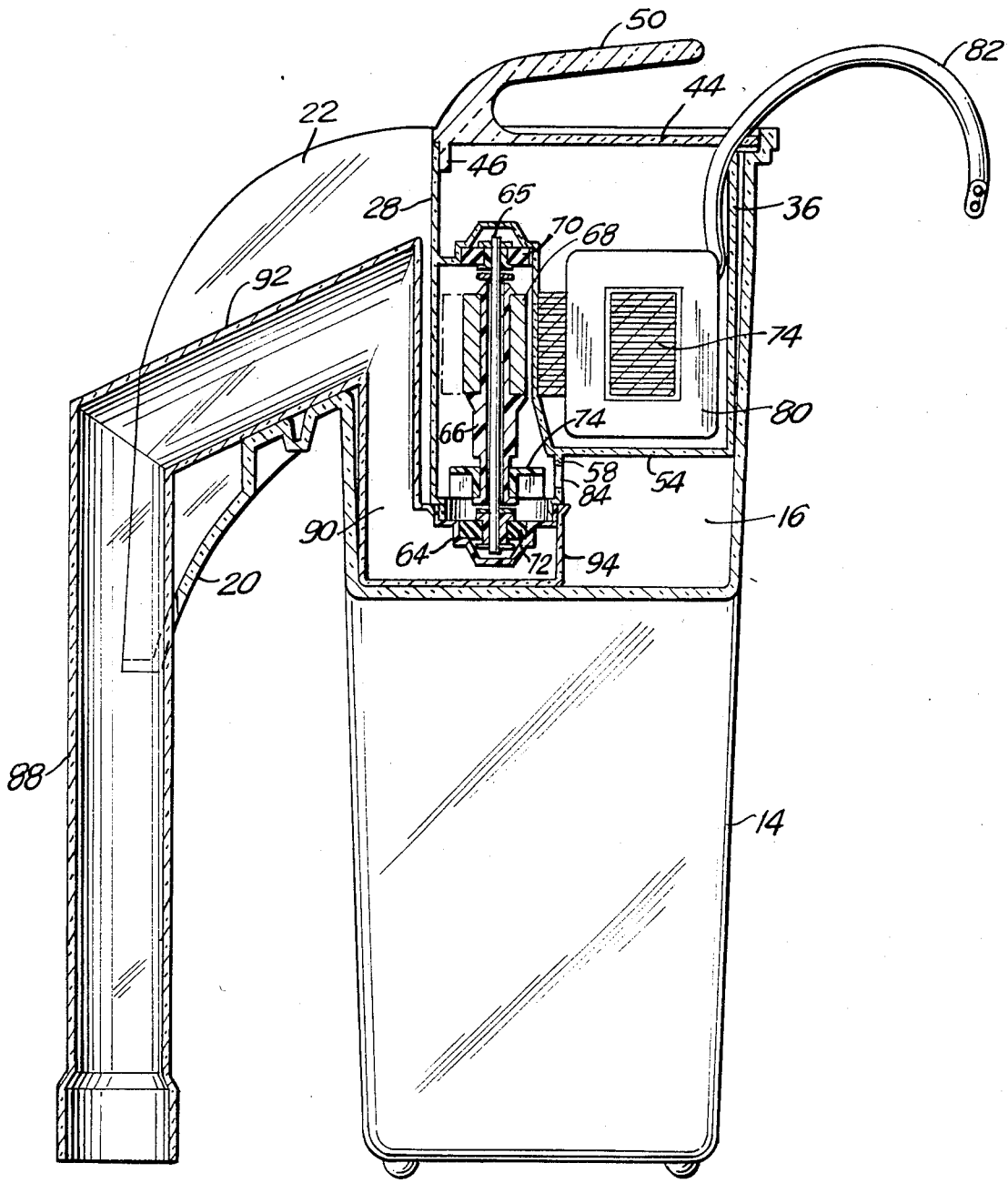
FIG. 2 is a cross sectional view taken through the assembled aquarium filter as shown in FIG. 1.

Referring now to FIGS. 1 and 2, the power pack assembly of the present invention is shown in conjunction with an aquarium filter. The aquarium filter is essentially of the type described in the aforementioned application and details thereof will not be explained. Briefly, the aquarium filter includes a base housing shown generally at 10 including an upper substantially rectangular body portion 12 with a depending compartment 14. The filter is typically formed of transparent material and includes an intake receiving chamber 16 in which the aquarium water enters and is retained in the receiving chamber. From the receiving chamber the aquarium water passes into a filtering chamber 18 containing filtering material. The water in the filtering chamber is cleaned and then re-enters the aquarium tank over the spillway at the forward section of the filter 10.

A suitably removable cover member 22 fits onto the filter along the ledge 24 and is received at the shoulder portions 26, in order to maintain an opening through which the filtered water can pass over the spillway 20.

The filter is driven by means of a power pack assembly which can removably fit into the receiving chamber 16 of the filter and utilized to draw water into the receiving chamber 16. Specifically, the power pack assembly includes an outer substantially rectangular housing 28 having opposing side walls 30, 32 and front and back walls 34, 36. An outwardly projecting lip 38 projects from the side and rear walls for use in suspending the housing in the receiving chamber. Specifically, the lip can rest on the ledge 40, the intermediate wall 42, and additional ledges provided in the receiving chamber.

A removable cover 44 is provided onto the power pack housing and includes depending skirt portion 46 for tightly fitting into the perimeter of the housing and closing it off. A notched section 48 in the rear is available for accommodating passage therethrough of the power coil. A handle 50 on the cover 44 is available for removal of the entire unit. The cover will be tightly fit, or even sealed onto the housing so that the cover 50 can be utilized to remove the entire power pack assembly.

Internally of the housing 30 there is provided a cylindrical compartment 56 which is maintained isolated from the surrounding housing. It is connected to the front wall 34 by means of the throat portion 60. The cylindrical compartment extends downwardly beneath the base wall 54 of the housing 30 so as to terminate in a neck portion 58.

The forward end of the neck portion 58 is open at its distal end for insertion therein of an impeller unit, shown generally at 62.

Figure 4:
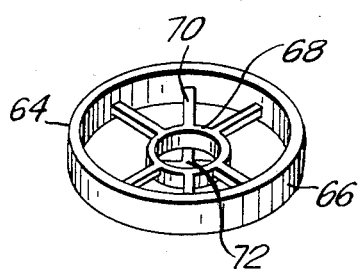
FIG. 4 is a perspective view of the end cap used to close off the neck portion of the cylindrical compartment extension depending from the power pack housing.

The distal end of the neck portion 58 is closed off by means of a shaft retainer and closure cap 64, best seen in FIG. 4. The closure cap includes a peripheral rim wall 66 interconnected with a central hub 68 by means of a plurality of spokes 70. The center of the hub 68 is recessed at 72 to accommodate the forward end of the impeller 62.

The impeller unit 62 is essentially as described in the aforementioned application. It includes a central shaft 64 on which is mounted a rotating magnet holder 66 with a permanent magnet 68 mounted thereon. Various bushings, bearings, mounting plugs, etc. are provided in order to retain the impeller securely in place. Specifically, the rubber bushing 70 is positioned at the upper end thereof and holds the upper end in place in the cylindrical compartment and the lower bushing 72 holds the lower end of the shaft in place in the cap member 64.

Rotatingly supported on the shaft and rotatingly engaged by means of the magnet 66 is an impeller 74. It should be appreciated that the operation of the impeller by means of the magnet is explained in the heretofore parent application. Accordingly, its details will not be explained at present. It should be noted, however, that the impeller of the present application is inserted in inverted orientation from that described in the parent application.

Placed inside the housing and surrounding the compartment 56 are provided a stack of stator laminations 74 defining a bore 76 therein with a slot thereinfront 78. The slot 78 appears on adjacent sides of the throat portion 60 and the cylindrical compartment 56 is received within the bore 76.

A coil 80 passes through the laminations and is connected to a source of energy means of the power plug 82. In this manner, upon energization of the coil, the stator laminations 74 will magnetically couple the magnet 68 so as to cause the impeller 74 to rotate.

As the impeller rotates, it causes water to be drawn into the front axial end of the neck portion 58 through the grid cap 64. Water drawn into the cylindrical compartment 56 is then passed out through the opening 84 provided in the peripheral wall of the neck portion 58. The opening 84 is in flow communication with the storage compartment 16 of the filter.

In order to hold the neck portion and to supply water to the power pack, there is provided an intake assembly shown generally at 86 and comprising a substantially U-shaped configured pipe arrangement. The downwardly depending front lower leg 88 serves as the intake pipe and the shorter leg 90 serves as the supply pipe. The two pipes are interconnected by means of a bight section 92.

The distal end of the supply pipe 90 terminates in a substantially circular pan portion 94 which fits onto the neck portion 58 downwardly depending from the power pack.

In this manner, aquarium water is drawn upwardly through the intake tube 88, passes through the interconnecting section 92 and downwardly through the supply pipe 90 where it passes into the pan so as to be sucked into the cylindrical compartment of the power pack upon operation of the impeller. This water is then ejected from the side opening of the neck portion to flow into the storage chamber 16 of the filter. As the water collects in the storage chamber, it passes to the filter chamber where it is filtered by the filter material and passed out over the spillway 20 back into the tank in a filtered condition.

It should be appreciated from a consideration of FIGS. 1 and 2, that the filter can be easily disassembled by removing the cover 22 and lifting up the power pack assembly which can be entirely removed from the filter. The intake assembly 86 can then also be removed for cleaning.

Figure 3:
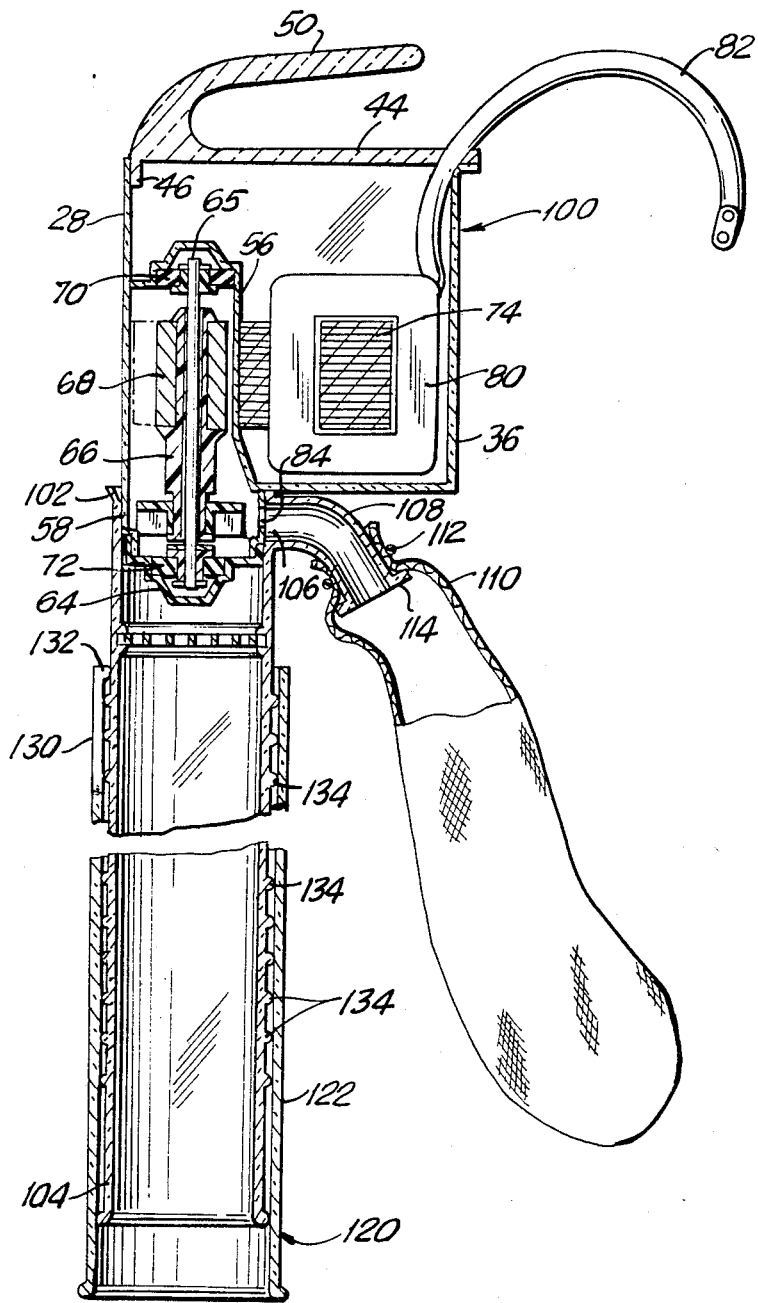
FIG. 3 is a cross sectional view through an aquarium vacuum utilizing the power pack assembly of the present invention.

Once the power pack assembly is removed, it can be utilized in conjunction with a vacuum for cleaning out the bottom of the aquarium tank. As heretofore mentioned, an aquarium vacuum is described in U.S. Pat. No. 3,549,015. In that case, the vacuum is powered by means of a hand operated bellows unit. As shown in FIG. 3, the power pack assembly, shown generally at 100, can be inserted into a vacuum device whereby the vacuum is electronically operated.

The neck portion 58 of the housing with the lower cap 64 in place, is inserted into the receiving mouth of a tubular member 102 serving as the main body member of the aquarium vacuum. The tubular member 102 has a lower end 104 which serves as the intake end for debris laden aquarium water. An ppening 106 in the upper side wall of the tubular member 102 is located in registry with the opening 84 provided in the peripheral wall of the neck portion 58 of the power pack unit. An outlet stem 108 extends in a downwardly direction from the opening 106 in the tubular vacuum member 102. A filter bag formed of cloth or other porous plastic material, or the like, 110 is connected at the distal end of the outlet tube 108. The bag is held in place by means of a string, rubberband, or clamp 112. The distal end of the tube 108 is outwardly flanged at 114 in order to facilitate retaining the filter bag in place.

Figure 5:
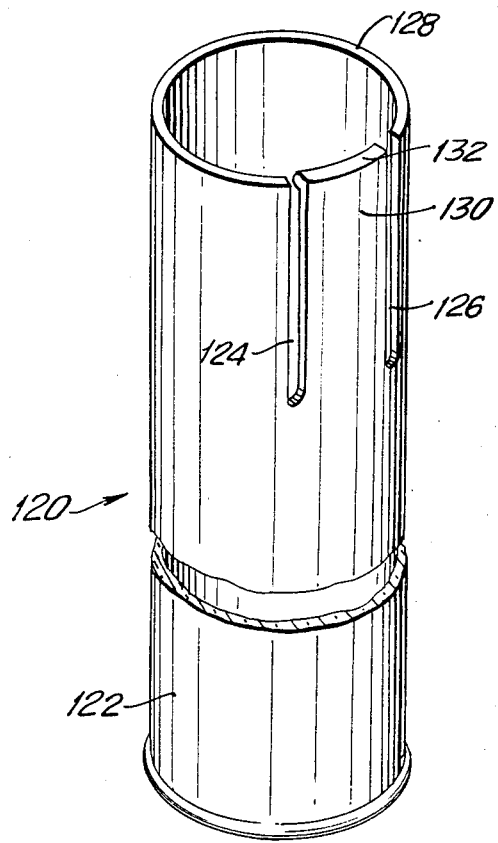
FIG. 5 is a perspective view of the vacuum extension tube for adjusting the length of the aquarium vacuum.

In order to adjust the length of the vacuum so that the vacuum can be held by means of the handle 50 and yet moved along the bottom of the tank, an adjustable extension member 120 is provided. As best seen in FIGS. 3 and 5, the extension member is of substantially tubular construction 122 and includes a pair of opposing longitudinally extending spaced apart slots 124, 126 extending from the upper edge 128. The peripheral wall 130 therebetween forms a resilient flap. An inwardly extending lip 132 is provided on the flap 130 as a retaining member.

Peripherally formed about the perimeter of the tubular body 102 of the vacuum are circular ribs 134. The extension 120 can be moved up and down along the tubular member 102 so as to cause the lip 132 to engage against a rib 134 and be held in place. However, because of the resiliency of the flap 130 the adjustable tube 120 can telescopically move along the tubular body member 102.

In operation, the power pack is inserted into the mouth of the tubular body member 102 and the coil energized. Debris laden aquarium water will be sucked up through the extension tube 120 and into the tubular body member 102 to pass through the grid like cap 64 and into the axial end of the compartment 56. The suction will be provided by means of the operation of the impeller. The water will then be cast out through the side opening 84 in the neck portion 58 so as to pass into the tubular member 108 and into the filter bag 110.

The filter bag itself is retained in the water as the vacuum is moved along the aquarium floor. The water will pass out of the filter bag and back into the water while retaining the debris within the filter bag. The filter bag can be easily removed and replaced after it has been filled up with debris.

It is therefore appreciated that the same power pack assembly can now be removed from the vacuum and reinserted into the filter as needed. The handle on the power pack assembly serves as the handle for the entire vacuum and also serves for easy insertion and removal of the power pack unit. Accordingly, the same power pack unit can be selectively utilized to operate the filter or the aquarium vacuum, as desired.

In order to clean the power pack assembly, the lower cap 64 can be removed whereby the impeller unit will be removable from its compartment for cleaning. The cover 44 can also be removed from the top of the unit to remove the laminations. However, normally, there is no need to enter into the housing since the compartment 56 is entirely sealed from the housing and accordingly, no fluid will go from the compartment 56 into the housing.

Additionally, an upper plug 140 can be provided at the top of the cylindrical compartment for further entry into the compartment, if desired.

There has been described heretofore the best embodiment of the invention presently contemplated. However, it is to be understood that various changes and modifications may be made thereto without departing from the spirit of the invention.

I claim:

1. A removable power pack assembly for selective application to an aquarium filter and an aquarium vacuum, said assembly comprising:
a housing;
a cylindrical compartment contained in said housing and terminating in a neck portion depending from said housing, means defining an axial aperture at the distal end of said neck portion permitting the intake of water from an aquarium tank, and means defining a side aperture in said neck portion permitting the discharge of water from the cylindrical compartment;
a motor unit positioned in said housing and comprising a stack of stator laminations defining a bore therein for receiving said cylindrical compartment, and having a motor coil crossing the laminations;
a pump impeller unit positioned in said compartment and magnetically coupled to said motor unit for rotation upon energization of the motor coil to pump aquarium water into the axial aperture where the water will then be discharged from the side aperture;
cover means secured onto said housing, and
means for temporary coupling of said housing to said filter and to said vacuum, whereby the housing can be selectively utilized to operate both the filter and the vacuum, as needed.

2. A removable power pack assembly as in claim 1, and comprising a cylindrical cap member secured onto the distal end of said neck portion and comprising a central hub for supporting one end of the impeller unit, a peripheral rim for securing onto the neck portion and a plurality of radial spokes extending between the hub and rim for defining a grid through which the aquarium water can enter said axial aperture.

3. A removable power pack assembly as in claim 1, and comprising a handle on said cover means for insertion and removal of the power pack.

4. A removable power pack assembly as in claim 1, and comprising a peripheral lip formed about the upper edge of said housing for resting onto a mating ledge portion provided on the aquarium filter.

5. A removable power pack assembly as in claim 1, wherein said pump impeller unit comprises a fixed shaft, a sleeve rotatable on said shaft, a magnet mounted on said shaft for positioning in magnetic flux relationship with said laminations, and an impeller rotatable on said shaft and operably driven by said sleeve, said impeller being positioned in said neck portion.

6. An aquarium filter assembly, comprising:
a housing unit adapted to be mounted on a wall of an aquarium tank, and comprising a receiving chamber for receiving contaminated water from the aquarium tank and a filter chamber for filtering the contaminated water, said chambers being in fluid flow communication with each other;
a removable power pack unit comprising an outer casing having a depending neck portion with means defining an inlet port and means defining an outlet port, the outlet port discharging into said receiving chamber, a motor unit in said casing, and a pump impeller unit extending into said neck portion and magnetically coupled to said motor unit for rotation thereby to draw the contaminated water into the inlet port, and
a unitary intake tube assembly supported on said housing unit and comprising a supply tube at one end thereof for insertion into the aquarium tank and a coupling member at the other end thereof for engaging said neck portion and coupling to said inlet port, to thereby supply the aquarium water to the receiving chamber.

7. An aquarium filter assembly as in claim 6, wherein said intake tube assembly comprises an inverted U-shaped configuration having said supply tube as one leg thereof, and a discharge tube at the other leg thereof, a cylindrical pan supported at the end of said discharge tube for receiving said neck portion, an aperture at the distal end of said discharge tube being in flow communication with said pan.

8. An aquarium filter assembly as in claim 7, wherein said pan is supported in offset relationship at the end of said discharge tube.

9. An aquarium filter assembly as in claim 6, wherein said receiving chamber includes an inwardly directed peripheral ledge, and said outer casing comprises a peripheral lip formed about its upper edge which lip rests upon said ledge.

10. An aquarium filter assembly as in claim 6 and comprising a cover member secured onto said outer casing and a handle on said cover member for removal of said power pack from said filter.

11. An aquarium vacuum for movement along an aquarium tank to remove debris from the aquarium water, comprising:
a tubular body member having a lower supply end for the ingress of debris laden aquarium water, an upper pumping end for drawing the aquarium water into the body member, and means defining a discharge aperture through a peripheral side wall for connection to a filter bag, and
a removable power pack unit comprising an outer casing having a depending neck portion for insertion into the body member, and having means defining an inlet port in flowing registry with the pumping end, and means defining an outlet port in flowing registry with said discharge aperture, a motor unit in said casing, and a pump impeller unit extending into said neck portion and magnetically coupled to said motor unit for rotation thereby, to draw the debris laden aquarium water into the inlet port and discharge it into the filter bag.

12. An aquarium vacuum as in claim 11, and comprising an extension tube telescopically receiving said body member for adjustment of the length of the vacuum, a pair of spaced apart axial slits formed through a peripheral wall of the extension tube partially extending along its length from a medial end thereof to define a resilient flap therebetween, an inwardly directed detent lip at the free end of said flap, and a plurality of spaced apart circular ribs projecting from the outer surface of said body member, said detent lip engaging an appropriate rib to maintain a desired extended length of the vacuum.

13. An aquarium vacuum as in claim 11, and comprising a removable grid member retained along the length of the body member for restraining the intake of gravel into the vacuum.

14. An aquarium vacuum as in claim 11, wherein said body member is cylindrical with the power pack being removably inserted at one end thereof and said supply end at the opposing end thereof.

15. An aquarium vacuum as in claim 11, and comprising a cover member secured onto the outer casing, and a handle on said cover member for removal of said power pack from said filter.

* * * * *